United States Patent [19]

Frenkiel

[11] 4,144,411
[45] Mar. 13, 1979

[54] CELLULAR RADIOTELEPHONE SYSTEM STRUCTURED FOR FLEXIBLE USE OF DIFFERENT CELL SIZES

[75] Inventor: Richard H. Frenkiel, Englishtown, N.J.

[73] Assignee: Bell Telephone Laboratories, Incorporated, Murray Hill, N.J.

[21] Appl. No.: 725,429

[22] Filed: Sep. 22, 1976

[51] Int. Cl.$^2$ .............................................. H04Q 7/04
[52] U.S. Cl. ..................................... 179/2 EB; 325/53
[58] Field of Search .................. 179/41 A; 325/53, 51

[56] References Cited

U.S. PATENT DOCUMENTS

| | | | |
|---|---|---|---|
| 3,663,762 | 5/1972 | Joel ..................................... | 179/41 A |
| 3,898,390 | 8/1975 | Wells et al. ......................... | 179/41 A |
| 3,906,166 | 9/1975 | Cooper et al. ...................... | 179/41 A |

OTHER PUBLICATIONS

"Application for Developmental Cellular System", Illinois Bell Telephone Company, Fed. Commun. Comm. File 20115-CD-P-76, 7/1975.
"High–Capacity Mobile Telephone System Technical Report", Bell Laboratories, Dec. 1971, on file with the FCC.
"A Look at the Future of Mobile Telephone Service", Norman A. Adams, *Telephony,* 2/17/75, pp. 37–44.

*Primary Examiner*—William C. Cooper
*Assistant Examiner*—Kenneth A. Chayt
*Attorney, Agent, or Firm*—Charles Scott Phelan

[57] ABSTRACT

The use of plural cell sizes in cellular high capacity mobile telecommunications systems is facilitated by providing dual service availability in an essentially geographically continuous large-cell grid and an overlaid and essentially geographically discontinuous small-cell grid. When using certain frequency channel set assignment plans, large-cell antenna sites employ their ordinary channel set assignments whether or not a small-cell antenna site is also present. When a large-cell site is operated in the vicinity of a co-channel small-cell site, the respective channels of the large-cell site are operated in a large-cell mode or a small-cell mode as required to cooperate with the overlaid small-cell site. When using frequency channel set assignment plans requiring departures from ordinary large-cell channel assignments, the departures are similarly effected on the large-cell site channels that are operated in the small-cell mode. Also shown is an arrangement for channel-sharing around the faces of a directional antenna site to reduce the impact of adjacent channel interference.

22 Claims, 17 Drawing Figures

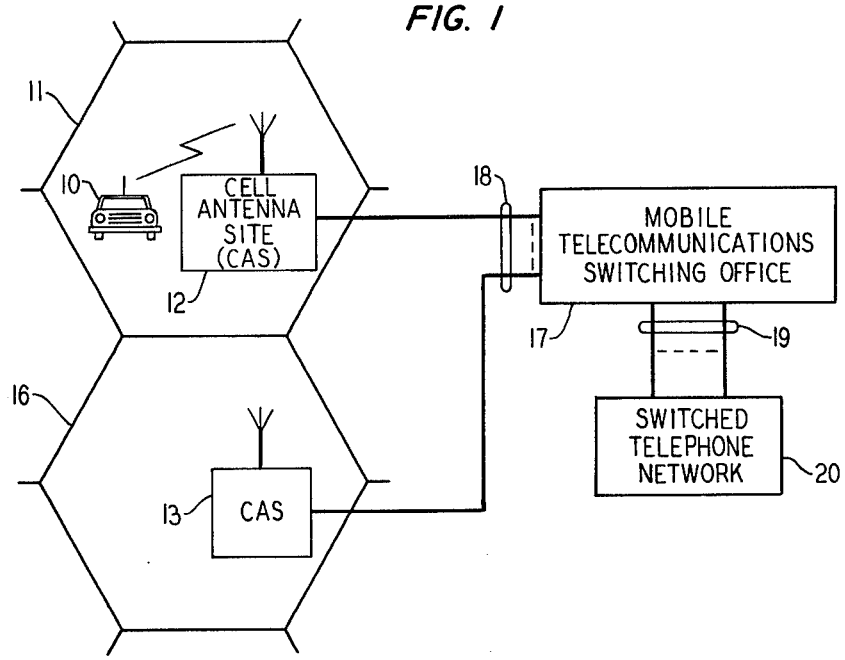

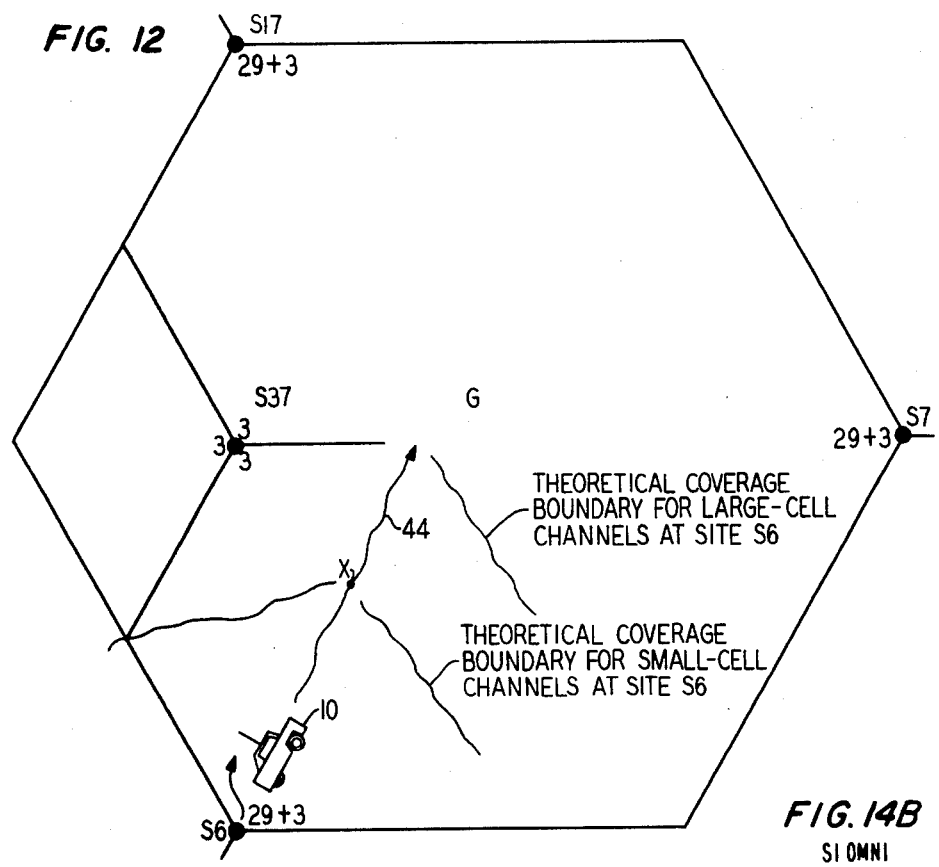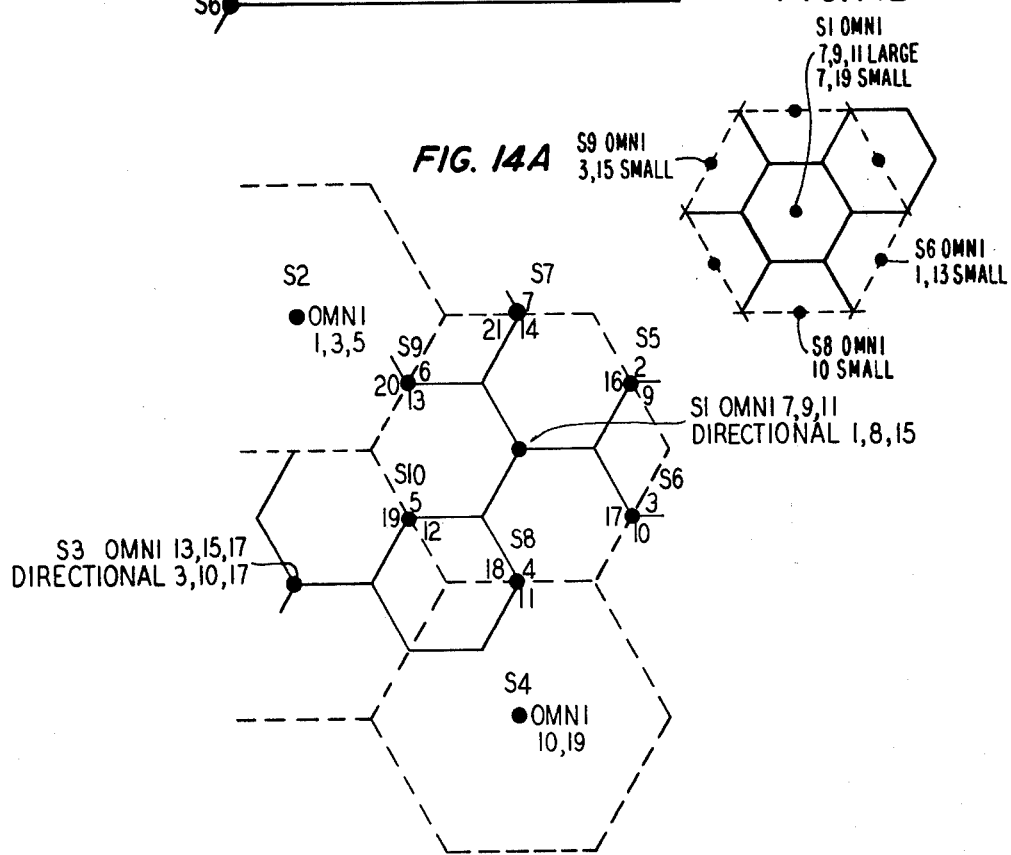

CELLULAR RADIOTELEPHONE SYSTEM STRUCTURED FOR FLEXIBLE USE OF DIFFERENT CELL SIZES

FIELD OF THE INVENTION

This invention relates to cellular high capacity mobile telecommunications systems, and it relates particularly to arrangements for facilitating operations therein with cells of different sizes.

DESCRIPTION OF THE PRIOR ART

In a known high capacity mobile telecommunications system a fixed number of sets of channels are distributed among the antenna sites serving a plurality of cells arranged in a predetermined reusable pattern. This pattern is reused throughout the mobile service area in such a way as to assure that cell antenna sites which are utilizing the same channel sets, i.e., cochannel sites, are spaced by a sufficient distance to assure that cochannel interference is held to an acceptably low level. It is known in such a system to borrow channels from one cell site for use at another cell site on at least a temporary basis. It is also known to pool the radios at a directional antenna site so that they may be available to any of the antenna faces at that site as required for communication traffic needs.

It is further known for a special case of dynamic channel assignment in the high capacity cellular systems, where traffic is not uniformly distributed, for some channels to be used only in the most dense reuse group, which group is not yet traffic limited and is in an area of uniform cell size. Since no channel reuse is involved as to those channels, they may be equipped to cover a single large cell and be used by mobiles in the small cells covered by that large cell when such channels are not otherwise engaged in that most dense reuse group. This technique is efficient in terms of equipment use, but it does not increase spectral efficiency since each large-cell channel can be used only once within the large-cell reuse distance. To increase system capacity in a given region it is necessary to increase spectral efficiency, i.e., increase the number of channel voice paths per unit of area; and one way to do that is to increase channel reuse in the region. This is typically done by creating in the region a group of smaller cells which can use channels more than once within the given region. Smaller cells are realized by splitting large cells to grow beyond the point at which each channel is used one time in the central reusable pattern.

Further, in prior cellular systems of the type described, when in the course of system growth it was necessary to replace large cells to form many small cells, it was heretofore deemed necessary to assign channels to the small-cell antenna sites in a shrunken version of the replaced-large-cell channel assignment distribution pattern. In general this required retuning in the old sites. Thus, at each system growth step when cells were to be split to introduce a new cell size, certain extensive, expensive, and inconvenient operations were required. Such operations included new site construction, radio moving, and radio retuning operations. In addition, after a cell splitting operation, an old cell antenna site was expected to require fewer radios than it required before the splitting operation. This would leave radios free for use in equipping new cell sites, but it would also leave radio equipment frames and ancillary equipment unused in that old cell site for a long period of time.

The previously described cell splitting operations would begin when one cell or one cell antenna site face uses up its nominal channel assignment. Splitting could be postponed to a limited extent by techniques which allow some channels to be reassigned in the dense traffic region on either a temporary or a long-term basis. In all cases, cell splitting becomes necessary when all channels have been used in the central group of cells of the region.

SUMMARY OF THE INVENTION

The foregoing problems of prior art high capacity mobile telecommunications systems are alleviated in an illustrative embodiment of the present invention by providing dual service availability in an essentially geographically continuous large-cell grid over the mobile service area and in an overlaid and essentially geographically discontinuous small-cell grid. Each equipped antenna site in the large-cell grid is also substantially coincident with a small-cell grid antenna site; and as traffic levels at such a large-cell site require, one or more channels at that site are operated in a small-cell mode.

In one embodiment of the invention, each large-cell antenna site employs its ordinary channel set assignments whether or not certain channels at the site are operated in the small-cell mode and whether or not a small-cell antenna site is also equipped for operation in the vicinity of the large-cell site.

In an embodiment wherein an equipped small-cell site is in a location other than the location of a large-cell site, at least one channel is assigned for use at that small-cell site, which channel is also assigned in the large-cell grid on a cochannel basis to two large-cell grid sites that are equidistant from the small-cell site along a straight line through all three sites.

It is one feature of the latter embodiment of the invention that the cochannel large-cell sites are spaced from the small-cell site by a small-cell channel reuse distance.

It is a further feature of the invention that any equipped large cell having an equipped small cell overlaid thereon can continue on at least some channel to provide to at least a part of the small cell the underlaid large-cell operation while the overlaid small cell is also served by the small-cell site. In addition such a large-cell site may provide both large-cell and small-cell service to the overlaid small cell on different ones of its channels.

Another feature is that the aforementioned cooperation between large and small cells permits a more gradual introduction of new cell sites than was possible in the prior art. Thus, service in small isolated regions of the service area can be supplemented by noncontiguous and even incomplete small cells. Furthermore, since large cells are able to use small-cell channels at existing sites on a restricted basis, the introduction of new cell sites may be postponed. This reduces the ripple effect, in which the removal of channels from the large-cell group for use by small cells causes additional large cells to split.

Another feature is that the channel assignments avoid adjacent channel assignments in any cell site and in almost every cell while allowing channels to be shared by two directive antennas at a cell antenna site.

A still further feature is that the equipped large-cell grid provides continuous geographic coverage over the service area both before and after the addition of at least one small-cell site in a so-called cell splitting operation; and any new small-cell site added in that operation provides additional overlaid service in the area that it covers, which area is geographically discontinuous in the small-grid plan until such time as further traffic growth warrants the addition of more small-cell sites adjacent to the first mentioned one.

BRIEF DESCRIPTION OF THE DRAWING

A more complete understanding of the invention and its various features, objects, and advantages may be obtained from a consideration of the following detailed description, the appended claims, and the attached drawings in which:

FIG. 1 is a simplified functional diagram of a high capacity mobile telecommunications system in which the invention is useful;

FIG. 2 is a chart of channel-sets for use in the system of FIG. 1;

FIG. 7 is a reproduction of the channel-set of FIG. 2, showing how the sets are split between the large and small cells in FIG. 6;

FIG. 12 is a simplified cell diagram illustrating theoretical coverage boundaries for an area having both large-cell and small-cell service;

FIGS. 14A and 14B are cell diagrams illustrating cell splitting operations from large cells with omnidirectional antennas to smaller cells with directional antennas (14A) or omnidirectional antennas (14B);

DETAILED DESCRIPTION

Figure 3:
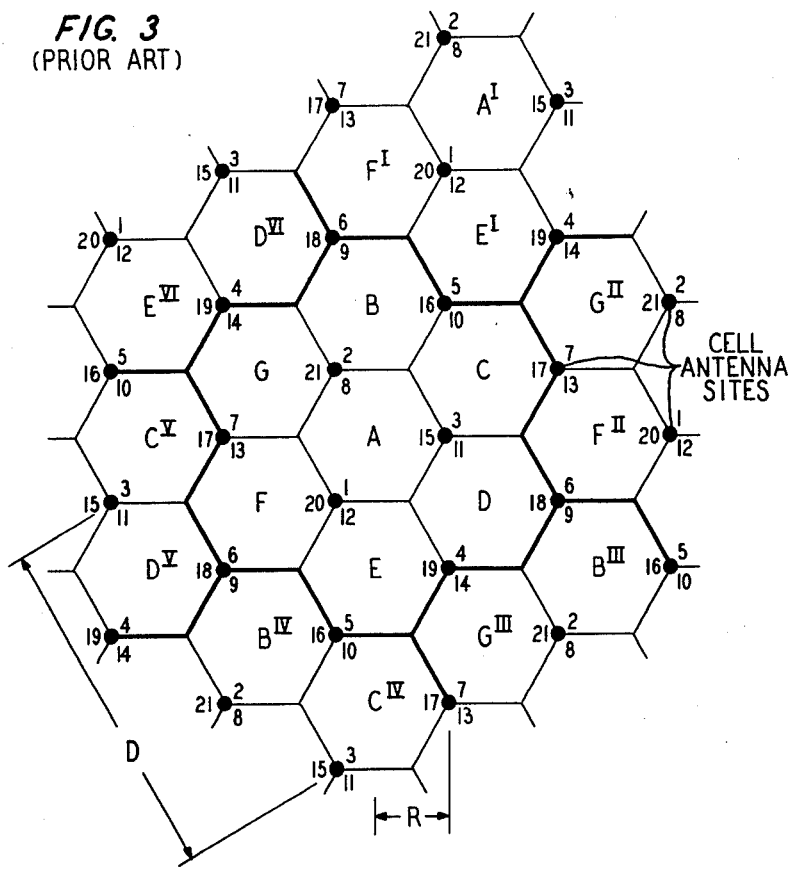
FIG. 3 is a channel-reuse pattern for a system of the type FIG. 1 using directional antennas and showing illustrative prior art channel-set assignments.

The present invention applies equally to an initial installation of a cellular mobile system and to a cell splitting operation during a growth phase of such a system. However, the invention is herein described in connection with the cell splitting aspect because that is the most frequently occurring aspect, and it raises the more difficult problems.

In FIG. 1, plural mobile units move about the mobile service area from cell to cell in a high capacity mobile telecommunications system of a type known in the art and in which the invention is useful. The system will be outlined to facilitate an understanding of operation with plural cell sizes. Only one mobile unit 10 is illustrated in FIG. 1, and it is located in a cell 11 of a generally hexagonal configuration. Radio telephone transceiver equipment in the mobile unit communicates with similar equipment in one or more cell antenna sites such as site 12 in cell 11. Another antenna site 13 is shown in an additional cell 16. Each cell antenna site relays communication signals between mobile units within its cell and a mobile telecommunications switching office (MTSO) 17 by way of respective communication paths 18. Each such path between a cell site and the MTSO 17 includes a separate voice grade circuit, or trunk, for each radio channel equipped at the cell site; and the paths 18 also include at least one data communication channel between the cell site and the MTSO for providing the data communication needed to operate the cell site in a high capacity mobile telecommunications system mode with respect to the equipped channels as is now known in the art. The MTSO 17 is also coupled through circuit 19 to a switched telephone network 20 that advantageously includes fixed subscriber telephone stations as well as various telephone switching offices. Although the type of system shown in FIG. 1 is known in the art, e.g., see U.S. Pat. No. 3,663,762 to A. E. Joel, it will be partially discussed herein to the extent necessary to demonstrate the application thereto of the present invention and the manner of using that invention.

Cell antenna sites such as the sites 12 and 13 in FIG. 1 may comprise omnidirectional antenna sites substantially centrally located in respective cells or they may comprise in each cell a plurality of directional antenna sites located, for example, at alternate corners of the hexagonal cells. In addition, one system in accordance with an aspect of the present invention includes a combination of omnidirectional and directional cell sites. These and other cell site arrangements are schematically represented by the single cell site generally indicated in each cell of FIG. 1. A single antenna is shown at each site in FIG. 1, but in one telecommunications system of the type herein considered, each radio channel is advantageously a pair of frequency spaced channels for providing duplex transmission and reception paths by way of separate transmit and receive antennas. Each such transmit antenna is in the present illustrative embodiment advantageously capable of handling the communications for up to thirty-two radios at its site. In addition, it is known in some systems to have the receiving function performed by a pair of spaced receiving antennas in order to provide diversity reception.

Each receiving antenna of a diversity reception pair at a cell site is advantageously coupled to channel receivers through a directional coupler, an amplifier, a power divider, and a group of channel preselection filters. Corresponding preselection filter outputs for each frequency channel of the two antenna filter output groups are coupled to different diversity channel inputs of the channel receiver for that frequency channel. Similarly each radio channel transmitter is coupled through a power amplifier and directional coupler to an input of a cavity multiplexer which combines sixteen radio channel signals for coupling through a second combiner (for two multiplexer outputs) and a bandpass filter to the transmitting antenna. The foregoing equipment is not separately shown herein.

In a cellular system of the type here under consideration, it is necessary to determine when an active mobile unit is in need of being handed off from a channel serving one cell to a channel serving another cell, or to a channel serving the same cell through another cell site, as the mobile unit moves among the cells. To this end, it is useful to note that various handoff criteria are known in the art and utilize features such as the use of phase ranging to indicate the distance of a mobile unit from a receiving cell site, the use of triangulation, and the use of received signal strength to indicate the potential desirability of a handoff. It is herein assumed, for purposes of illustration, that a handoff criterion based on received signal strength is employed. Where this criterion is applied to directional antennas at a single site, the result is to provide information on direction as well as signal level. Thus, a cell site typically includes a location receiver (not shown) which is tunable, on command from the MTSO 17, to any of the various cell site receiving channels in use to provide signal information to be employed by the MTSO for locating mobile units with respect to the various cells of the system.

A cell site also advantageously includes logic arrangements for comparing the received signal from a mobile unit on a channel served by the cell site to a predetermined threshold corresponding to the size of cell served by that channel so that the cell site can signal the MTSO 17 when the received signal drops below a predetermined threshold thereby suggesting that a channel handoff may be required. Such logic may also compare the channel reception at the different directional antenna faces of a cell site for determining whether or not the mobile unit using a particular channel can be better served by a channel at a different antenna face at the same site. A typical cell site also includes equipment (not separately shown) such as a power supply arrangement, circuits which interface with the incoming paths 18, a controller for coordinating the operation of the various cell site equipments and for performing limited signal processing at the site, maintenance and test circuits also coordinated by the controller, and data modems for providing data communications by way of the fixed communication paths 18 to the MTSO 17 and by way of radio channels to the various mobile units within the cell.

MTSO 17 in FIG. 1 includes a switching network with ports for communication lines from respective radio channel circuits at the various cell sites as well as for the fixed lines 19 extending to the remainder of the switched telephone network 20. In addition the MTSO 17 advantageously includes dual access trunks as set forth in the Joel patent for facilitating the operation of switching a call connection from one cell site to another without substantial interruption of communication on that connection. Also included in the MTSO 17 is a central processing unit for processing data received from the cell sites and supervisory signals obtained from the network 10 to control the operation of setting up and taking down call connections. One suitable processing unit for this purpose is the No. 1 Electronic Switching System (ESS) processor employed in the Joel patent and otherwise more fully described in the several papers of the September 1964 issue of *The Bell System Technical Journal*. See for example, "Organization of No. 1 ESS Central Processor" by J.A. Harr et al. at pages 1845–1922 and "Organization of the No. 1 ESS Stored Program" by J. A. Harr et al. at pages 1923–1959. A more recent processor that can be used is that described by R. E. Staehler in "1 A Processor-High Speed Processor for Switching Applications" at pages 26–35 in the papers of the 1972 International Switching Symposium.

In the processing unit of the MTSO 17 resides the bulk of the processing capability and memory for processing data from the various cell sites. More particularly in relation to the present invention, the central processing unit of the MTSO 17 recognizes a data signal from a cell site which reports that reception from a mobile unit on a particular radio channel has dropped below a predetermined threshold level for the particular cell-size mode of operation for that channel at that cell site. Thereafter, the central processing unit causes the interrogation of cell sites which are near the aforementioned cell site and the evaluation of responses from the interrogated sites to identify the most suitable one of those sites which has better reception of the mobile unit than does the original reporting cell site. Such a newly identified cell site is then the subject of a search by the central processing unit for a free channel, and a switching of the call connection from the original reporting site to that newly identified site and channel. Also commands are transmitted to the mobile unit in question to cause it to switch to the identified free channel. This transfer of control from cell site to cell site is called handoff. In the course of this mobile unit locating and handoff operation, the MTSO 17 must be able to recognize the size of the cell which is currently serving a particular mobile unit as well as the sizes of nearby cells to which that mobile unit may be handed off.

FIG. 2 is a chart representing an illustrative block of radio frequencies which are useful in a cellular high capacity radiotelephone system of the type indicated in connection with FIG. 1. The various frequencies are advantageously divided into twenty-one channel sets, and it is illustratively assumed that there are thirty-two channels per set to provide a total block of 672 duplex frequency channels. Each channel has but one channel number in FIG. 2, but actually represents the frequency-spaced send and receive frequencies of a duplex channel. Channels which are adjacent to one another in frequency are assigned to different but adjacent channel sets as indicated by the sequential channel numbers shown in FIG. 2. Thus, the first channel in set 21 is adjacent to the second channel in set 1, and similar arrangements prevail for other channel sets. Likewise, the channels of set 1 include the thirty-two channels 1, 22, 43, 64, . . . 652.

Since the use of adjacent channels within a cell or at a cell site is avoided, adjacent channels are advantageously 30 kHz apart in the transmit band and 30 kHz apart in the receive band. For example, channel #1 in FIG. 2 may have a nominal frequency of 825.03 MHz for transmitting in the mobile-to-cell-site direction and 870.03 MHz for receiving at the mobile from the cell site. Correspondingly, channel #2 would then have the frequencies of 825.06 MHz and 870.06 MHz in those transmit and receive directions, respectively. Similarly, channel #22 would have the frequencies 825.660 MHz and 870.660 MHz in the transmit and receive directions, respectively. At least one channel at each cell antenna site is dedicated for use as a set-up channel for data communications for initiating call connections with mobile units. A discussion of set-up channels is not necessary to an understanding of the present invention although the invention is applicable to certain set-up channel grids in a mobile service area.

In an illustrative directional antenna type of prior art system (to to subsequently considered in connection with FIG. 3), the twenty-one channel sets of FIG. 2 are nominally assigned in a repeating 7-cell pattern, on the basis of three sets per cell. In the directional arrangement the hexagonal cells have antenna sites at alternate corners thereof; and, considering a 7-cell reuse pattern, each cell site is assigned three channel sets, i.e., ninety-six channels. Those three channel sets are assigned to the three antenna faces, respectively, of the site in the respective directions of the three different hexagonal cells which share that antenna site at a common corner. Correspondingly, each cell, being served by one antenna face each at each of three different antenna sites, has one channel set at each of those antenna faces. In such an embodiment in the prior art, a channel which was nominally assigned to one corner of a cell was alternatively available for shared use at another corner of the same cell, but either an extra radio was required if the channel was regularly equipped at both sites or retuning and switching a radio to a different antenna were required if each site had a spare radio that could be tuned to an available shared channel and switched to a site face needing that channel. Such a channel could not be used in an adjacent cell served by the same cell site unless a search of potential interferers was first performed.

In an omnidirectional antenna system of the prior art, and which might include a 12-cell reuse pattern, channels might be separated into twelve sets with one set used in each cell. Alternatively, the twenty-one channel sets shown in FIG. 2 may be distributed among the twelve omnidirectional sites on the basis of one set per site; and the remaining 9 sets may be distributed to cell antenna sites on the basis of traffic needs. It should be understood, however, that regardless of the antenna arrangement, the channel sets assigned to a particular cell site have the respective channels thereof equipped only as needed by traffic demands.

It is perhaps useful to note that although hexagonal cells are shown in FIG. 1 and other figures, and regardless of the type of antennas employed, the boundaries of respective cells are those which would prevail for theoretically flat terrain. In actual practical operation, there is no need for concern about the precise location of the boundaries or of mobile units with respect to those boundaries. Boundaries are indicated for convenience in considering mobile vehicle location which is the crux of system determinations of when to handoff a mobile unit from a channel served by one antenna face to a channel served by a different antenna face at the same or a different antenna site. The presence of non-uniform terrain features or of large buildings can cause actual handoff to occur at places other than a cell boundary. Although actual handoff generally takes place near a boundary, it is evident that a vehicle may make a significant incursion into an adjacent cell before a channel handoff is completed and without losing a call connection. Indeed, one prior art system operates on such a premise and allows a mobile unit which is being served from an antenna in one cell to travel as much as a full cell radius or more into an adjacent cell without being handed off, or conversely, to be served via a voice connection from an antenna in an adjacent cell while the mobile unit is still well within its own current cell.

In cellular systems of the type illustrated in FIG. 1 herein, it is nevertheless advantageous to accomplish the handoff determination and execution as rapidly as possible because mobile units may often move at high speeds, and the quality of communication falls off rapidly as such a unit departs from its serving cell. Correspondingly, the possibility of excessive cochannel interference rises if the mobile unit gets too far from its serving cell site without being handed off to a proper new site.

All boundaries are advantageously uniformly oriented with respect to the surface of the earth so that similar cellular systems in different adjacent geographical areas can, with time, be conveniently edge merged as population and traffic requirements grow over the years. Likewise channel sets assigned to sites and reused in other sites advantageously have the same geographical orientation about their respective cell sites in both the prior art and the invention described herein.

A given group of channel-sets is assigned once in a predetermined distribution pattern within a given group of cells in a predetermined cell pattern. That same group of channel-sets are advantageously reused in a similar distribution pattern in like cell patterns surrounding any given initial cell pattern. This reuse capability arises from the fact that transmission powers on the desired channel received at the cell site and mobile unit are kept sufficiently higher than cochannel interference to prevent degradation of the voice channel in most cases. Since interference is reduced by being at a greater distance from the receiver, the minimum reuse distance is usually specified in terms of a number of cell radii. For a 7-cell pattern such as will be described in connection with the present invention, the reuse distance is advantageously 4.6 cell radii.

FIGS. 3–6 illustrate a typical prior art channel assignment scheme and a cell split used with it. FIG. 3 is a diagram of a cellular system using directional antennas located at alternate corners of each cell. A dot at each of those corners represents a cell antenna site shared by three hexagonal cells having that point in common as a boundary intersection, and each such site has three directional antennas facing into those three cells, respectively. The system comprises a repeated 7-cell group pattern utilizing the 21 channel sets of the diagram of FIG. 2. Thus, in FIG. 3, each antenna is assigned one channel set, as indicated by set numbers at the site-indicating dots, so there are three sets assigned to each cell site. A cell designated "A" is assigned the three channel sets, 1,8,15. The cell B is assigned sets 2,9,16, and the cells C through G are similarly assigned evenly spaced triads of the sets to utilize all twenty-one sets in the seven cells A–G. This use of an even triad of sets (sets spaced by a number of sets equal to the number of cells in the reusable cell pattern) within a cell facilitated implementation of the priot art cell-splitting technique, to be described. Within any triad, corresponding channels in different sets are spaced by at least seven channels, and successive channels within a set are spaced by twenty-one channels.

Channel-sets assigned to cells A–G are reused in six surrounding groups of seven cells which are shown in part with Roman numeral superscripts on the cell letter designators to indicate the six different groups. the channel sets are distributed over the group of cells in the repeated pattern in a manner which is designed to achieve separation of 4.6 cell radii between cells which use the same channel-sets, and which is also designed to avoid adjacent channel interference problems. A typical cell radius R and channel reuse distance D are indicated in FIG. 3 for the cell size there shown.

Adjacent channels are not assigned at the same cell site or at corners of the same cell in FIG. 3. An assignment scheme which separates adjacent channels in this manner reduces the problems of adjacent channel interference and allows a close channel spacing. Some channels which are nominally assigned to one corner of a cell may alternatively be used at one other corner of the cell to meet heavy traffic loads as previously noted. In cell E, for example, some channels from set five (nominally assigned in the lower corner of the cell) may alternatively be used in the upper corner of the cell. They may not, however, be used in the right-hand corner without raising the possibility of adjacent channel interference between sets four and five being used at the same site.

Figure 4:
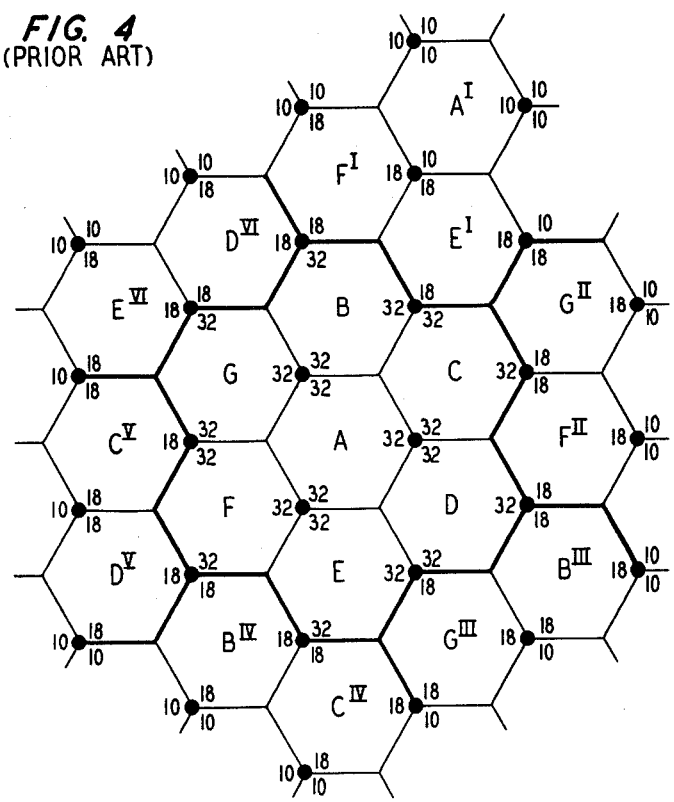
FIG. 4 is a reproduction of the system of FIG. 3, showing an example of the numbers of channels equipped at each cell site antenna.

In FIG. 4 is shown the example of FIG. 3 but wherein the numbers at the cell sites are the numbers of equipped channels, rather than channel-set numbers, at each antenna just before cells are split. Each of cells A-G is equipped with 96 channels; thus, all channels are in use in these seven cells. That condition represents full 7-cell saturation for an assumed even traffic loading that facilitates a description of prior art cell splitting and its problems. In practice there was more likely to have been uneven loading, e.g., heaviest in cell A, and borrowing of unused channels from cells B-G until all twenty-one channel sets were fully utilized in the 7-cell group. This type of operation delayed the inconveniences of prior art cell splitting technique as long as possible. In the adjacent ring of cells around cells A-G each cell, e.g. $E^{VI}$, uses 54 channels; and outside that ring the cells use 30 channels each.

Figure 5:
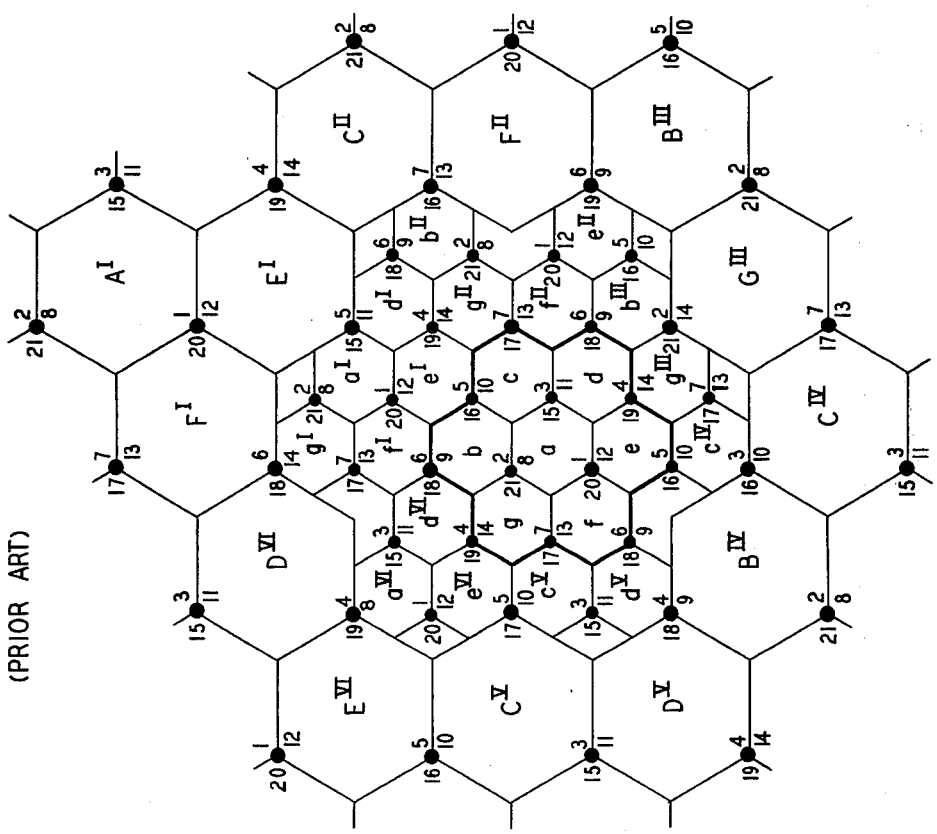
FIG. 5 is a reproduction of the FIG. 3 cell diagram illustrating channel-set assignments after a cell split of a type contemplated in the prior art.

In FIG. 5, the system has grown by a small amount, and a split has been effected by replacing cells A-G with small cells. The new small cells are labeled with lower case letters; and, as in FIG. 3, superscripts are added to indicate cell groups around a central cell group. Large-cell sites are indicated by large dots and small-cell sites by small dots. In this cell splitting arrangement, it can be seen by comparing cells a-g of FIG. 5 with cells A-G of FIG. 3 that the cell pattern was shrunk; and channel assignments for the small cells are generally obtained by simply shrinking the assignment plan for the large-cell pattern. Thus, the small cell a in FIG. 5 is assigned channel sets 1, 8, 15, cell b is assigned sets 2, 9, 16, and so on.

Figure 6:
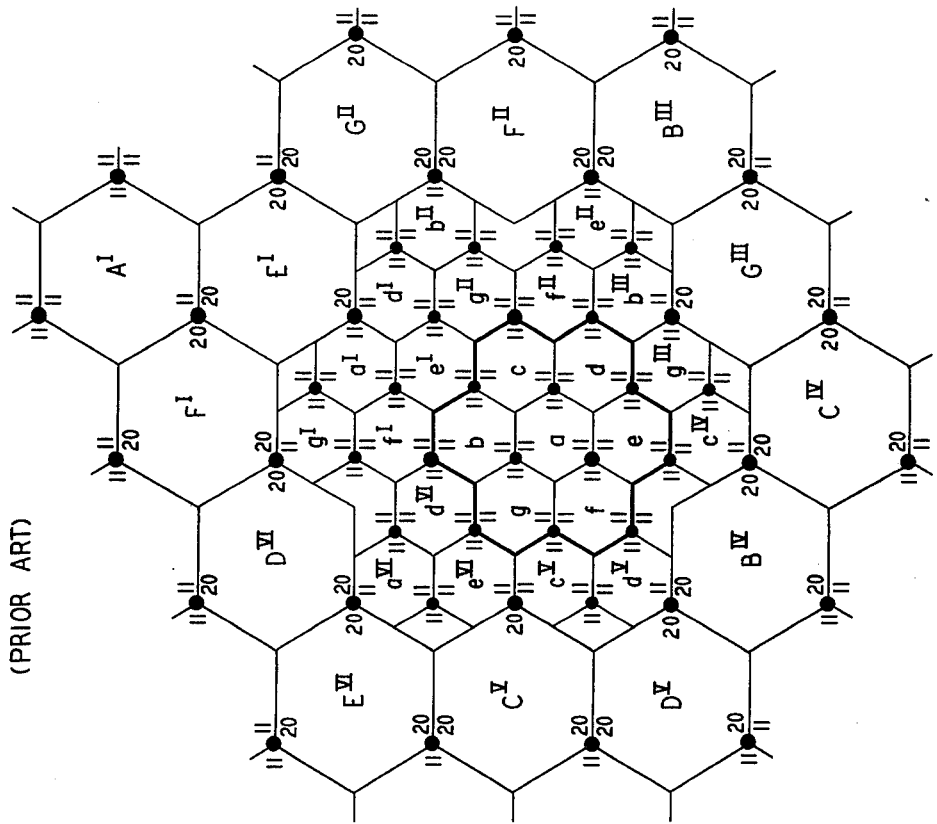
FIG. 6 is a reproduction of FIG. 5, showing the numbers of channels equipped at each antenna after the cell split.

FIG. 6 shows the numbers of channels equipped in the assigned channel sets at each antenna of FIG. 5 for a typical prior art split. FIG. 7 shows how the channels of the respective channel sets are divided between large and small cells in FIG. 6 in order to avoid cochannel interference between large-cell and small-cell sites having the same set assignments and within the large-cell reuse distance of one another. Eleven channels per set are required for the small cells, leaving twenty-one available for each large-cell antenna. Thus, small cell b uses eleven channels from each of channel sets 2, 9 and 16, and another twenty-one channels from each of these sets are available for large B cells. Cells $B^{III}$ and $B^{IV}$ each uses twenty of these channels at each corner, in the example of FIG. 6.

It will be appreciated from FIGS. 6 and 7 that a further increment of growth requiring twelve channels, instead of the eleven shown, at each antenna face of the small cells triggers more splits and retuning. Thus, the required additional small-cell channel drops the FIG. 7 horizontal dividing line between small-cell and large-cell channels one step and leaves only twenty, instead of twenty-one, channels available for use at each nearby large-cell antenna. However, it can be shown that the same increment of growth requires twenty-one channels at each antenna of those nearby large cells in the next ring of large cells, i.e., cells $E^I$, $F^I$, $G^{II}$, etc. in FIG. 6; and since only twenty are available, these cells must also split. That is, as traffic growth demands more channels in the newly-created small cells, the need for more splits rapidly ripples radially outward.

It will be appreciated from FIGS. 5 and 6 that in the course of a cell splitting operation, cell sites which served replaced cells in the large-cell grid (indicated by larger cell site dots) remain in service either as small-cell sites or with at least one antenna face serving a small cell. Large-cell operation at such sites and faces is discontinued. Each of these site faces was equipped with thirty-two channels before the cell split (see FIG. 4), but it uses only eleven channels after the cell split (see FIG. 6). The radios not needed at the large sites can be moved to help equip the new small sites. While the large-cell site faces will eventually require thirty-two radios again, they are left with much installed but unused frame capacity for a long time after the cell split. Additionally, all but one of these site faces use different channel-sets after the cell-split, and that requires that the eleven radios which remain in service but retuned to new channels. The radio moving and retuning can cause significant service blockage since the replaced large cells are not in service to carry the traffic. Finally, it can be shown that the configuration of FIGS. 5 and 6 has achieved an increase in capacity of about 10 percent over the configuration of FIGS. 3 and 4 and has used twenty-one new cell-sites to do so.

Figure 8:
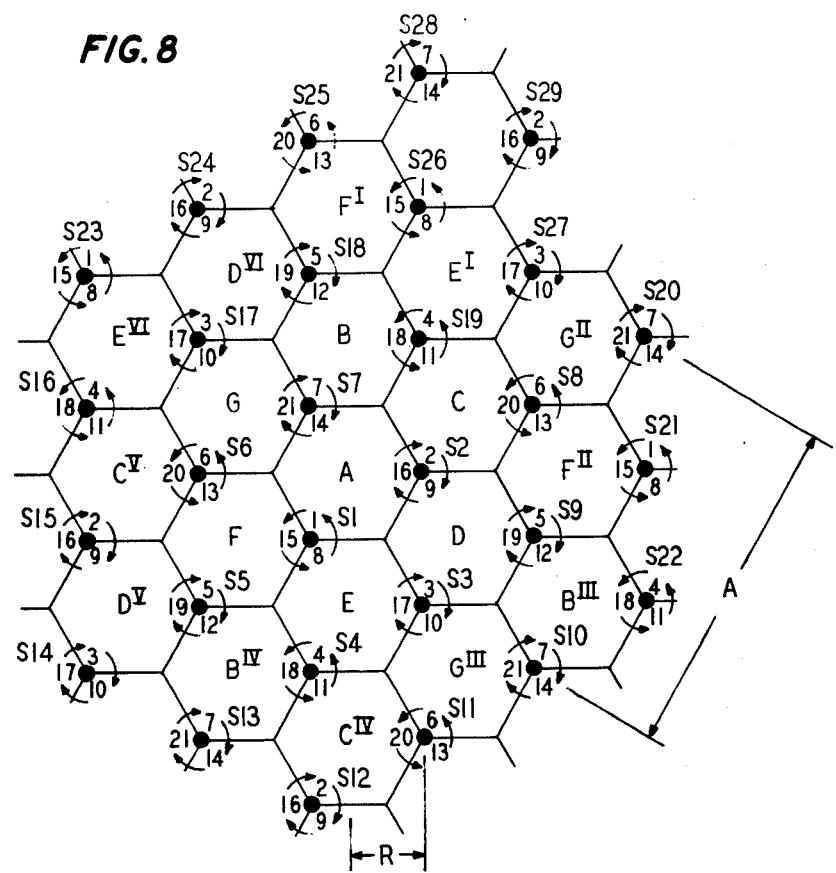
FIG. 8 shows a pattern of channel assignment and channel-sharing which is used in the present invention.

A system growth illustrated in FIGS. 8-12 uses a cell splitting technique in accordance with the present invention. FIG. 8 shows the system before the cell-split. For convenience of description the sites illustrated are numbered S1 through S29. It is the same configuration of cells as shown in FIGS. 3 and 4 except that a triad of evenly spaced channel-sets such as 1, 8, 15, which uses every seventh channel in the array, is now associated with a cell site rather than a cell. Cell A in FIG. 8 uses channel sets 1, 14 and 16, while cell-site S1 uses the even triad 1, 8 and 15.

Channels which are used in one corner of a cell are not shared by other corners of the same cell, as in the prior art, but are advantageously shared by another antenna at the same cell site. This sharing is indicated by arrows in FIG. 8 and will be subsequently discussed in more detail. At site S7, for example, channel-set 7 in cell B may be shared by cell A. This allows an increased traffic demand in cell A to be met by switching a radio from one directive antenna at site S7 to another antenna at the same site. Retuning of this radio is not required. Conceptually, channel-sets are being reused in two directions at every seventh cell site rather than in two corners of every seventh cell. Both methods are essentially equivalent in the suppression of cochannel interference but the present method of sharing around a cell antenna site allows the radios at a site to be shared without being retuned and without requiring extra radios. In the prior art, a radio which was switched to another face of a cell site had to be retuned to a channel permitted in the adjacent cell served by that face because the prior art, as in FIG. 3, practiced sharing between corners of a cell and could not also use sharing around a site without undue risk of cochannel and adjacent channel interference.

Employment of the seven triads of channel-sets around the seven cell sites of a reusable cell pattern in FIG. 8 also minimizes adjacent channel interference. Because of the indicated sharing around cell sites, channel sharing between sites is not practiced; and adjacent channels are, therefore, never used in the same cell site. In general, adjacent channels will be used at two corners of the same cell only when both corners are using radios switched from adjacent cells. In such a case, for example, cell A might use adjacent shared channels from set 8 at site S1 and from set 7 at site S7. Since this implies an overload condition at both corners of the cell, however, it is an event of low probability. That is, where this type of sharing is employed, it can be shown that about 85 percent of calls will be handled on channels at their nominally assigned corners; and about 15 percent will be handled on channels which have been switched from an adjacent cell. Thus, the probability of two users in the same cell being on adjacent channels is on the order of $(0.15)^2$ since each must be using a channel in its least probable position. The exception is that channels from set 2, when switched into cell D, may be adjacent to channels from set 3 used in the same cell at their nominal face. Of all calls handled in the system, none will use channels adjacent to a channel used at the same site, and only about 2 percent will use a channel which is adjacent to a channel used in the same cell. This results in a low probability of adjacent channel interference, and allows these channels to be more closely packed spectrally, i.e., at 30 kHz spacing, than would otherwise be the case since less filter rejection is needed.

Figure 9:
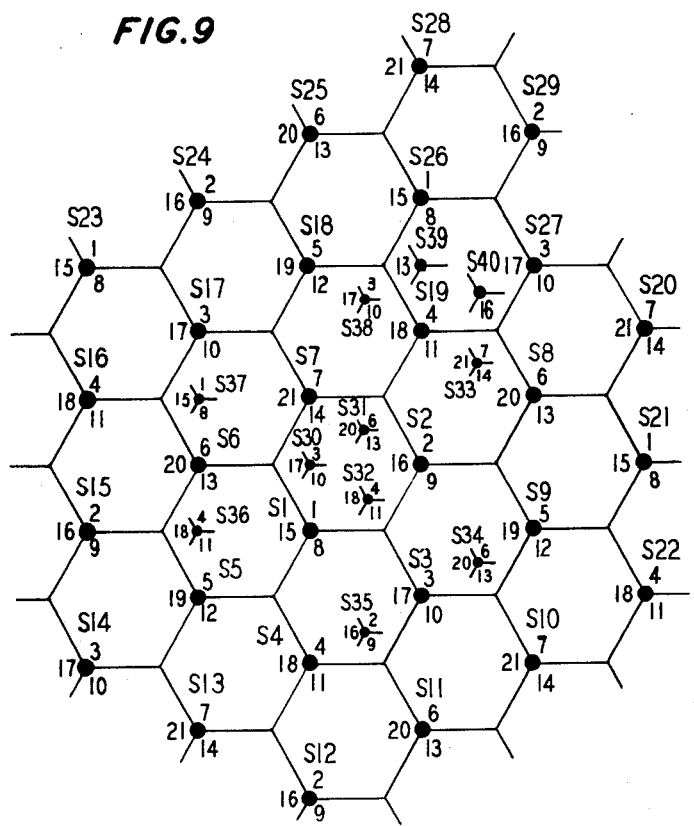
FIG. 9 shows cell sites and channel-set assignments after a cell split in accordance with the present invention and in a system which has achieved the same capacity as that of FIG. 4.
Figure 10:
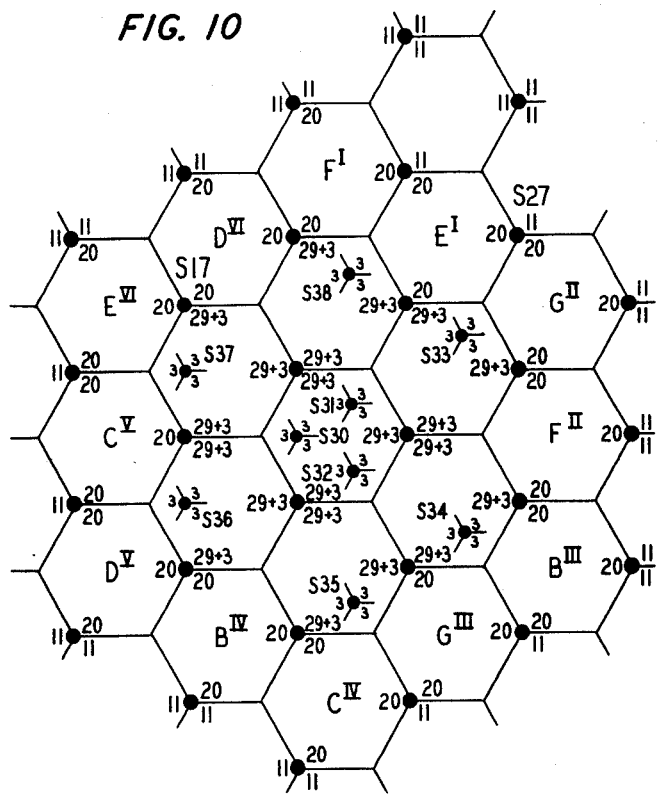
FIG. 10 shows the number of channels used at each antenna for the configuration of FIG. 9, using the present invention.

It is assumed that the configuration of FIG. 8 is equipped with the same numbers of channels at each antenna as are indicated in FIG. 4. Since thirty-two channels are used in each of the twenty-one channel-sets serving cells A-G, further growth requires a cell-split. A cell-split which is sufficient to achieve the same increase in system capacity as that of FIGS. 5 and 6, but which utilizes the present invention, is illustrated in FIGS. 9 and 10. These figures show the addition of only nine new cell sites designated S30 through S38. FIG. 9 indicates the channel-sets which are assigned, and FIG. 10 indicates the numbers of channels of such sets which are equipped at each antenna.

It has been noted that the example shown in FIGS. 3-7 has a uniform traffic demand to facilitate description of cell splitting. The same type of example is carried through to FIGS. 8-10, but it should become apparent as the description proceeds that the new cell splitting technique of FIGS. 9 and 10 is so convenient it can be carried out from time to time starting at a lower level of channel saturation, or near saturation, such as, for example, when only a single cell site antenna face becomes saturated. In addition, the new cell splitting arrangement is modular in the sense that a change can be effected at one system location without having major effects at other locations because channel-sets are being reused at new cell antenna site locations rather than being shifted from large-cell sites as was the case in the prior art. Consequently, in applications of the invention cell splits advantageously start with a single small increment of growth, e.g., the addition of one small-cell site. Although the addition of a single site is the smallest practical step in system growth, the basic cell splitting scheme of the present invention can be employed independently of the number of cells which must be split.

The new cell sites S30-S38 in FIG. 9 are at the same locations as were nine of the new cell sites in FIGS. 5 and 6. Each new small-cell site is midway between two cochannel sites on the large-cell grid and which are separated from the new site by the small-cell reuse distance. New cell site S38, for example, uses channel-sets 3, 10, and 17 is midway on a straight line between sites S17 and S27 which are cochannel large-cell sites using channel sets 3, 10 and 17, and which are separated from site S38 by the small-cell reuse distance. It has been discovered that the channel-set assignment for the new site S38 in FIG. 9 should be the same assignment employed at those two large-cell sites S17 and S27. In this way, when traffic and the systems have grown enough so that at least some channels at sites S17 and S27 will be operated in the small-cell mode, as will be subsequently described, and thus those sites will have become operative parts of the small-cell grid, their assigned channel-sets will remain 3, 10, and 17, and no retuning will be required.

Also shown in FIG. 9 are two additional sites S39 and S40 each having at least one channel equipped in sets 13 and 16, respectively, at faces directed toward site S19. This illustrates a phase of growth in which a single small cell is equipped in a large cell.

Figure 11:
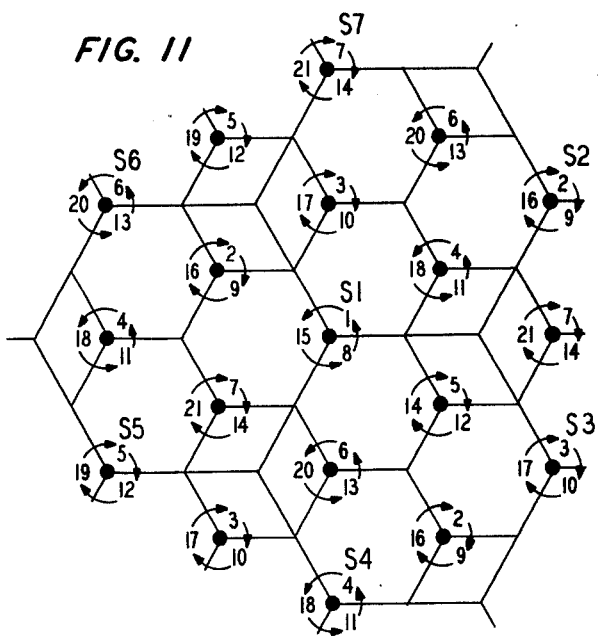
FIG. 11 is an extension of a part of the example of FIG. 9 to show a full grid of smaller cells with channel-set assignments and channel-sharing arrangements.

FIG. 11 shows in enlarged scale the central region of FIGS. 9 and 10 after the full complement of small-cell grid sites has been installed and channel-sets have been assigned to the small-cell sites following the above described rule. Large-cell sites S1-S7 in FIG. 11 are retained with no change in the channel assignments or sharing rules which existed in the larger cell size. If the six closest small-cell sites which now surround site S1 are compared to the six closest large-cell sites which surrounded site S1 in the large-cell grid of FIG. 8, the large-cell channel-assignment pattern will be seen to have rotated through an angle of 120 degrees in the counterclockwise direction to achieve the small-cell pattern. It may be seen that such rotation has taken place about each large-cell site. The total group of three sets which are assigned to any small-cell is different from the total group assigned to any large-cell. In FIG. 9, for example, cell A used sets 1, 14, 16, while in FIG. 11, these sets are in three different small-cells. Stated differently, the assignments at two sites of any small-cell, which is wholly included within a large-cell and shares a common third cell site with that large-cell, are different from the channel assignments at the corresponding two corners of that large-cell. Cochannel separation rules already described are maintained, however, and the previously noted avoidance of adjacent channel locations is also achieved in the new cell size. The next cell-split to cells of half the radius of the smallest ones shown in FIG. 11 will cause a further rotation of the assignments at new sites surrounding each old cell site by 120 degrees, again preserving the desired cochannel and adjacent channel separations and requiring no retuning at old sites. A third cell-split to a further halved-radius size will cause a third rotation of 120 degrees and yield a return to the initial channel assignment pattern orientation of FIG. 8. Thus, the channel-assignment rule may be applied to achieve the desired result through any number of cell-splits, without requiring the retuning of any channels. Cochannel interference is avoided by appropriately selecting the operating modes of respective channels to match the size of the cell in which each operates.

Viewing FIGS. 9 and 10, it may be seen at cell site 38 that three channels (FIG. 10) from each of channel-sets 3, 10, and 17 (FIG. 9) are equipped. These are used at cell site S38 in the small-cell mode, i.e., for mobiles having higher signal levels indicating a probable proximity to site S38 consistent with the smaller cell size. To prevent cochannel interference, if any of these nine channels are also equipped in cochannel large-cell sites S17 or S27, they must also at such large-cell site be used in the small-cell mode. In practice this simply means that these small-cell-mode channels at the large-cell sites will tend to be used for only those mobiles which are near the cell site, while the large-cell-mode remaining channels can be used for any calls served at that site. The traffic handling capacity of the site is thus redistributed among its channels but not reduced.

In FIG. 10, for example, the southeastward facing (lower right as illustrated) antenna of cell site S17 is equipped with all thirty-two channels in set 10 as it had been before the cell-split. Twenty-nine operate in the large-cell-mode and three are now used in the small-cell mode, i.e., for mobiles having sufficiently high measured signal levels, as indicated by the numbers "29 + 3" at the antenna. The same situation is similarly indicated at other large-cell sites. It should be noted that no hardware changes for channel-assignment are required at site S17. The same thirty-two channels which were equipped before the cell-split are still in place and combined onto the same antenna. Only the criteria for use of the three small-cell-mode channels, as applied by the cell site and the MTSO in the locating and handoff process, have been modified.

In all splitting envisioned in the prior art, the new cell size was installed in a contiguous block of cells, expanding radially as far as was necessary to meet the traffic demand. The larger cells were replaced, i.e., no longer operated, in this area; and the new small-cells were equipped to meet the full traffic demand from that portion of the system. In the technique of the present invention, the larger cells continue to operate in a channel-reusing-mode coordinated with the other large-cells in the system; and to the maximum extent possible, they serve the traffic demand offered in that area of the system. Since the large cells provide geographically continuous service, new sites are used as supplementary servers to the large-cell grid. Small cells are not necessarily either complete or contiguous to one another, and they are initially designed to carry only a small part of the traffic in the area of each new small-cell site. In FIG. 9, six of the central large-cells are only partly served by overlaid small-cells, which are only partly equipped with sites and, thus, are not contiguous to each other. It is to be understood that the term "overlaid" is used in an electromagnetic sense whereby one grid system, or array of electromagnetically defined service regions, is superimposed upon another in an electromagnetically transparent fashion. Thus, service is available through either of the two grid systems, without interference, to mobile units traveling in a portion in a mobile service area where both systems are present. Service in the area not covered by these new small-cell sites is provided by the old large-cell sites, and traffic which could be served through a channel in the small-cell mode, but which is blocked on the small group of servers available in this mode, is overflowed to a large-cell channel serving the same area.

Since a contiguous grid of small cells is not necessary in the present invention, fewer new sites are required. In FIG. 9, the nine new small-cell sites which are shown serve some of the traffic which would otherwise be routed to different ones of the old large-cell sites. This allows approximately the same growth which was achieved using twenty-one new sites in FIG. 5. Since the large cells continue to serve most of the traffic in the split region of FIGS. 9 and 10, fewer channels are required in the new small-cell sites than were required in FIG. 6. In the example shown in FIG. 10, twenty-nine channels are still available for large cell use in each of the seven central cells, leaving much additional capacity for the next ring of large cells, i.e., cells $F^{II}$, $B^{III}$, etc. Recall that such next ring of large cells was on the verge of splitting in the prior art system of FIG. 6 as discussed in connection with FIG. 7.

Since all the old large-cell sites of FIG. 10 continue to use all channels which had been equipped before the cell-split, no equipment must be removed from these cell sites. Since the old large-cell sites continue to use large numbers of channels, their trunking efficiency is not impaired by the cell split. Similarly since traffic which is blocked at the new small-cell sites is permitted to overflow to the old sites, the overall trunking efficiency of the system is high. Further growth may be achieved by equipping more channels from each set at the nine new sites, and transferring these channels to the small-cell mode at the old large-cell cochannel sites also using them within the large-cell reuse distance. Alternatively, more new small-cell sites can be added which also use three channels per set as do the first nine new sites. In practical cases, both methods will be used. Eventually, all the new small-cell sites shown in FIG. 11 will be installed; and a complete, in terms of numbers of sites, small-cell grid will exist in the area shown in FIG. 11. The process of cell splitting has been reduced to a gradual and continuous addition of cell sites and radios, with no retuning, reconfiguring, or equipment removal.

It has been pointed out that fewer channels are used in the small cell sites in FIG. 10 than in the prior art, and the next ring of large cells ($F^{II}$, $B^{III}$, etc.) is no longer on the verge of a further cell split. In FIG. 10, 29 large-cell channels per set are still available (only 20 being actually equipped) in this ring as compared to 21 channels per set in FIG. 6 (as indicated in the FIG. 7 table). As growth continues in FIG. 10, more channels per set will be used in the overlaid small cells leaving fewer large-cell channels for the mentioned next ring of large cells outside the overlaid region. However, those large cells are also growing and will require more channels. Eventually the available large-cell channels will not meet the demand in that next ring of large cells. This might occur, for example, when 26 channels are required at each site face serving cell $F^{II}$ and seven channels per set are required in the overlaid small cells within that next ring. Something has to give because that totals thirty-three channels, and only thirty-two channels are in each set. In the prior art, the mentioned next ring of cells ($F^{II}$, etc.) around the overlaid region would be required to split, but in the present invention no new cell sites are added at this point. Instead small-cell channels from the group of $32-26=6$ channels not yet used in that ring are added at the corners of cells $F^{II}$, $B^{III}$, etc., and used in the small-cell mode for calls with appropriately high signal-levels. These cells can use a total of ninety-six channels each before new cell sites are required. In general, further growth can continue without new cell sites until either (a) a total of thirty-two channels per antenna site are installed in the existing cell sites, or (b) the small-cell channels which are added at these sites are serving all possible calls having appropriately high signal levels. Eventually, new cell sites must be added, but postponing their addition until high system capacities are reached is a desired objective from a cost standpoint.

The cell splitting technique illustrated in FIGS. 9-11, which does not require retuning of cell site radios, is valid for certain cell grids in which the position midway between cochannel cell sites is unoccupied prior to the cell split; i.e., in which there is no large cell site midway between two cochannel large cell sites. In this case a new site will be constructed at that point during the cell split and may be assigned the same channels as the two large-cell sites it is between without cochannel reuse problems. Such cell grids include, but are not limited to, hexagonal cells having repeating patterns of 3, 7, 9, 13, 19, . . . cells. These patterns differ in their capability to separate adjacent channels.

However, regardless of the pattern used or of the shape of the nominal cell, the other concepts considered herein, such as dual cell-size service in a system growth configuration and restricted channel sharing at cell sites with properly assigned channels, are useful to facilitate cellular system operation and growth. For example, in systems that require retuning on splits, the retuning can be done gradually because underlaid large-cell operation continues to carry traffic during retuning of selected channels. In such cases one would turn on the new cell sites and simultaneously turn off any channels at the old sites which might interfere. At this point the system could carry as much or more traffic as before the cell split. It would then be possible further to increase capacity by gradually retuning and turning on the radios which had been turned off. At all times the coverage is geographically continuous and the system capacity is never reduced.

FIG. 12 illustrates one typical mobile unit location and handoff situation and is an enlarged portion of a cell grid illustrating one large cell, i.e., cell G in FIG. 8, with a single overlaid cell site S37 for the smaller cell size as shown in FIG. 10. Twenty-nine channels at each of the large-cell sites are used in the large-cell mode, while three are used in the small-cell mode. Nine channels are equipped in the small-cell mode at the new site, three at each site face. Based upon measured signal level, the mobile unit 10 has been assigned to one of the three small-cell channels at cell site S6. As the mobile unit traverses the path indicated by an arrow 44, measurements are made at site S6 to determine that the received signal level continues to exceed the threshold associated with the small-cell mode. For the purpose of example, it is assumed that this signal level falls below the desired threshold as the mobile unit reaches a point X along the theoretical coverage boundary for small-cell channels at site S6. It should be noted that mobile unit signal level readings taken up to this point have involved only cell site S6, and that this threshold failure occurs at point X regardless of the presence or absence of small-cell sites such as S37.

When failure to exceed the small-cell signal level threshold is noted at site S6 several alternatives exist. If the signal level exceeds the large-cell signal-level threshold, which may be about 12 db lower to include mobile units at approximately twice the small-cell radius, the call is handed off to a large-cell channel at the same cell site S6. Alternatively, based on signal strength data collected at the request of the MTSO, the mobile unit may be handed off to small-cell site S37. A still further alternative action since signal strength is quite variable, is that the best server might be a large-cell channel at site S17 or site S7. Since calls may be freely handed between different cell sizes, continuity of coverage is not required in the overlaid small-cell grid.

Figure 13:
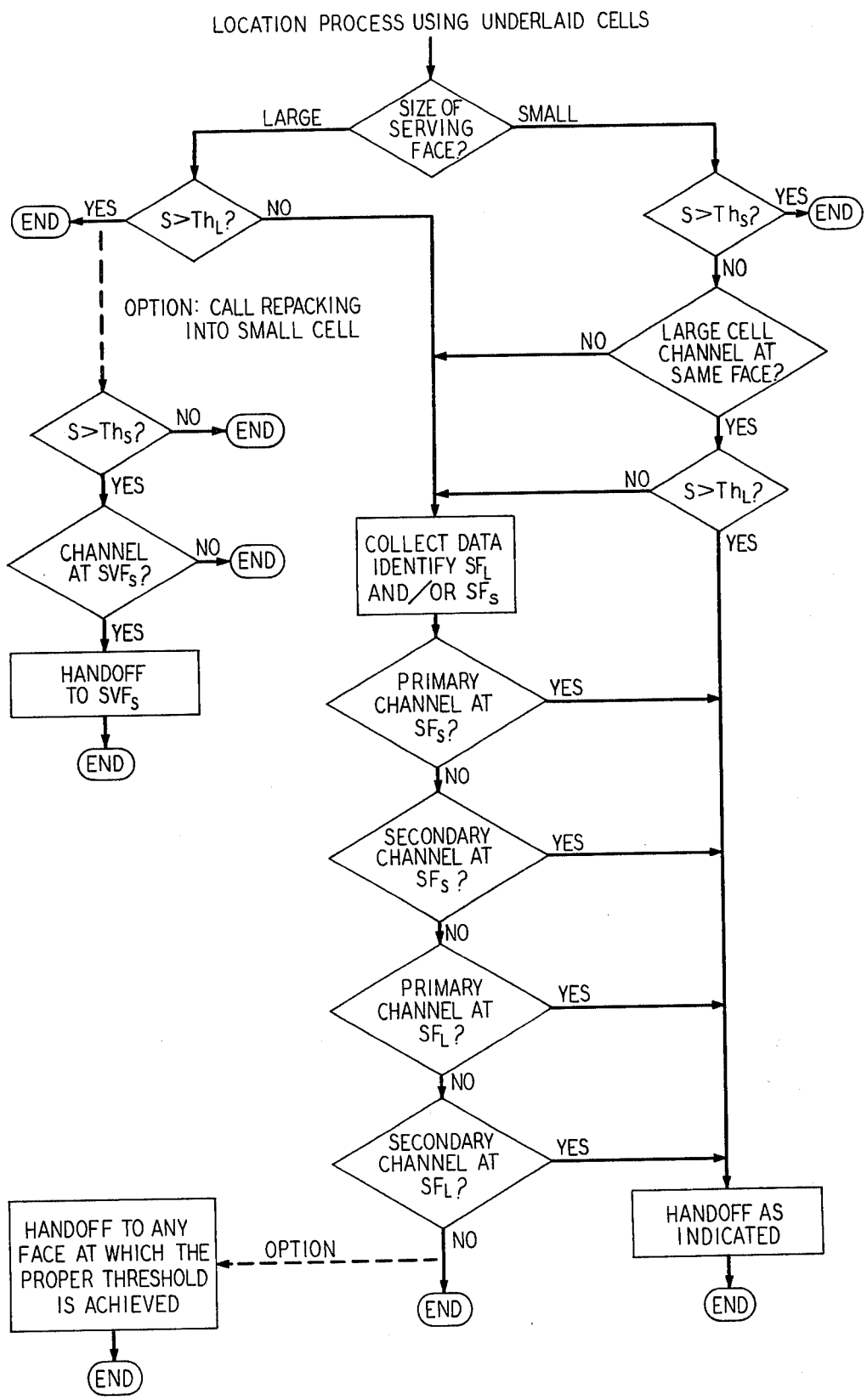
FIG. 13 is a flow chart for a mobile unit location and handoff algorithm for a system using plural cell sizes set up in accordance with FIG. 9.

FIG. 13 is an illustrative process flow diagram for the central processing unit included within MTSO 17 for carrying out mobile unit location and handoff. The process represents an adaption of known location and handoff techniques, for a multiple-cell-size system having only one mode of service in each area, to the system of the present invention with dual-mode service in at least one part of the service area. Thus handoff is effected from one channel to another in a system in which plural cell grids provide service to a common region, e.g., as in FIG. 12. Each grid operates on a different threshold mode of a common signal characteristic criterion which is indicative of mobile unit signal radio frequency power received at an antenna site. The object of the method of FIG. 13 is to place a mobile unit with substantially higher received signal power than is necessary to meet system minimum signal-to-interference ratio requirements on a channel where higher interference might be expected without failing to meet those requirements. One such system is that structured in accordance with FIGS. 9-12 wherein there are overlaid small cells and underlaid large cells serving some area in common.

Although the process shown in FIG. 13 is carried out primarily in the MTSO central processing unit, some aspects thereof are more conveniently accommodated in a particular cell antenna site which is handling, or may handle, a mobile unit call connection. FIG. 13 also assumes that channel sharing arrangements (mentioned earlier and to be further described herein) are in effect. In such arrangements, a primary channel, or server, is one which is used in its normally assigned position to serve a mobile unit (e.g., according to the set numbers shown in FIGS. 8 and 11); and a secondary channel, or server is one which is used on its shared position at an adjacent face of the same antenna site (e.g., according to the arrows shown in FIGS. 8 and 11).

The process of FIG. 13 is entered during periodic check by the system on mobile unit location. The central processing unit in the MTSO has data indicating mobile unit identification and identity of a specific radio and cell site antenna where that mobile unit was last assigned for service. An initial step for the processing unit is to decide whether the channel at the antenna face which is serving the mobile unit in question is operating on a large-cell mode or a small-cell mode. This decision can be made, for example by accomplishing a typical lookup operation in memory or by checking the state of a predetermined bit identifying the specific channel radio then serving the mobile unit. If the serving channel is operating in a large-cell mode, the receiving signal (S) from the mobile unit must be checked to determine whether or not it is greater than a predetermined large-cell signal-level threshold ($Th_L$). Although this step is shown as an integral part of the FIG. 13 process, it is advantageously performed by logic circuits known in the art, but not herein separately shown, and located at the serving cell site. If the signal S is larger than the threshold, the locating process is ended. However, if it is not larger, a data message is transmitted to MTSO 17 identifying the mobile unit, the serving cell site antenna and channel radio and the fact that the circuit is operating at or below threshold. Such a report causes the central processing unit to enter a common process step for collecting data from other antenna site faces and from adjacent faces of the serving cell site preparatory to determining a destination channel for handing off the mobile unit. Alternatively the data from adjacent faces of the same site is transmitted to the MTSO when the aforementioned data message is sent.

If the initial serving-cell-size determination step finds the serving channel to be operating in the small-cell mode, the receiving signal S is checked to determine whether or not it is greater than the small-cell threshold $Th_S$. If it is, the locating process ends as before. However, if the signal S is equal to or less than the threshold, a check is made to determine whether or not there is an available channel operating in the large-cell mode at the serving cell site face. If not the process advances to the aforementioned common data collecting step. However, if there is an available large-cell channel, the mobile unit signal S is checked to see whether or not it is above the threshold $Th_L$. If above that threshold, the mobile unit is handed off to the newly selected channel and the locating process ends. If S is not greater than $Th_L$, the process advances to the data collecting step.

In the data collecting step the central processing unit interrogates other antenna faces at the serving cell site, as well as cell sites for adjacent cells. This is an effort to identify an antenna site and face for each cell size (a) which is receiving the mobile unit signal S with a strength that is at least in excess of appropriate thresholds for channels at the respective faces, and (b) higher in signal strength than other antenna site faces which meet (a). If no antenna site and face are found to meet condition (a), the call is continued on its then current serving channel until supervision is lost. At that time, the cell site serving radio is turned off; and the mobile unit automatically retunes itself to a set-up channel so the subscriber can try to re-establish the call connections.

Assuming that the selected best antenna site faces include both a large-cell site face $SF_L$ and a small-cell site face $SF_S$, the availability of channels for a new call connection at these faces is then checked. In one useful sequence, the first check is to determine whether or not there is a primary channel available at the selected face in the small-cell mode ($SF_S$). If there is such a channel available and the mobile unit signal on that face is greater than the small-cell threshold, the mobile unit is handed off to that channel and the process ends. If there is no such channel available, a check is made for a secondary channel at the selected cell site face $SF_S$ in the small-cell mode. If there is such a secondary channel, the MTSO 17 sends a data message to the cell site of the face $SF_S$ directing the cell site to switch that channel to the selected antenna face and a handoff is effected to that channel at the same antenna face. If there is no secondary channel available, a further determination is made for the availability of primary and secondary channels operating in the large-cell mode at the selected face ($SF_L$). If a channel is found on one of these last two successive channel search decisions, the mobile unit is handed off and the process ends. If none are found, the locating process ends; and the call is allowed to continue at the serving face. Alternatively, had no channels been found at the selected antenna faces, $SF_S$ and $SF_L$ (the ones of all interrogated site faces with the best reception), a further option is available. In that option, all available data from the interrogation is reviewed; and the mobile unit is handed off to a cell site antenna face meeting only the aforementioned condition (a) that is, having a level of signal reception above the appropriate threshold for the available channel even though that level is not the best level of all those determined by interrogation.

Returning to the step treating the eventuality in which the signal S from a mobile unit being served on a large-cell channel is found to exceed the threshold $Th_L$, there is an option available as indicated in the left-hand portion of FIG. 13. In certain systems it is advantageous to consider the possibility of repacking a call that is working on a channel in the large-cell mode onto a channel operating in the small-cell mode, if such is available, and thereby utilizing fully all available small-cell mode channels before large-cell mode channels. This insures greater availability of the large-cell channels, which have lower signal thesholds and are more likely to be usable for a new call. To this end, the signal S is checked to determine whether or not it exceeds the threshold $Th_S$. If not, the optional process is ended. However, if it does exceed the threshold, a search is made for an available channel at the serving face $SVF_S$ in the small-cell mode. If no channel is available, the process ends; but if a channel is available, the mobile unit is handed off and the process then ends.

FIG. 14A illustrates the case of a cell splitting operation where the system has started out with large cells operating through omnidirectional antenna arrangements; and at the time of splitting, a conversion is initiated to the directional antenna type of opertion. An omnidirectional antenna site is, of course, operable with some omnidirectional channels in the large cell mode and others in the small-cell mode as will be discussed in connection with FIG. 14B. However, a split between omnidirectional and directional is first specifically considered in FIG. 14A because it is sometimes advantageous to begin operation of a cellular mobile radio system using omnidirectional antennas at the center of the respective cells and wherein those cells are quite large; e.g., cells of a radius of about eight miles. However, as traffic grows, it is desirable to change to the directional mode at the time of the first cell splitting phase, and FIG. 14A illustrates one such arrangement.

In FIG. 14A the large omnidirectional cells are indicated by broken lines and the split directional cells are indicated by solid lines. The omnidirectional cells require a 12-cell channel assignment pattern with at least one channel set per cell, or a total of 12 channel sets. Since the traffic demands on these very large cells may be quite nonuniform, however, it is advantageous to use a larger number of channel sets, such as the twenty-one sets used in the directional case, and to equip multiple sets at heavily loaded cell sites. Consider, for example, a large omnidirectional cell served by site S1 employing channel sets 7, 9 and 11 are fully equipped with the thirty-two channels per set. The maximum capacity of this site is $3 \times 32 = 96$ channels before cell splitting.

In the course of the splitting operation in FIG. 14A, small, or directive, cell sites S5-S10 are added; and the channels at the omnidirectional site S1 are gradually tuned to sets 1, 8, and 15 and connected to directional antennas. Each new site lies substantially at the center of one side of the large cell served by site S1 and is also approximately midway between omnidirectional cell antenna site S1 and a contiguous omnidirectional cell site. An example is directional site S9 which is midway between S1 and S2.

The FIG. 14A system represents an early, cell splitting operation of the system. New directional sites, and old sites being converted from omnidirectional to directional operation, are assigned channel sets for directional operation consistent with the desired directional channel assignment pattern shown in FIG. 8. The channel assignment to the first directional site is arbitrary, i.e., there is no necessary relationship of the omnidirectional assignment grid to the directional assignment grid. When it comes to actually equipping a state for directional operation, the choice of channels from the assigned sets is guided by considerations similar to those already outlined in connection with FIGS. 8–12, and makes use of the continued operation of the underlaid omnidirectional cell grid as the overlaid directional cell grid grows with growth in traffic. Thus, directional site faces are initially equipped with a small number of channels from each set, these channels then being unavailable in a large-cell mode to omnidirectional large-cell sites within the large-cell reuse distance. Radios using these unavailable channels must be turned off at the large-cell sites. Such channels are then advantageously disconnected from their omnidirectional antennas and retuned to the appropriate small-cell channels for use at that site and connected to directional antennas. In FIG. 14A for example, it is assumed that before the cell split, site S1 had been equipped with the full channel sets 7, 9, and 11 using omnidirectional antennas. If three channels per set are to be used in the small cells, it is necessary to turn off at site 1 three channels from each of sets 7, 9, and 11; and those channels are now used in new radios in the directional small-cell mode in sites S7, S5, and S8, respectively. The nine available radios that had just been turned off at site S1 are retuned to small-cell channels in sets 1, 8, and 15 and connected to the appropriate directional antennas at site S1. Sites S2, S3, and S4 must be similarly handled if the small-cell channels were in use at those sites. The simultaneous use of underlaid and overlaid cell grids makes the transition gradual, and only a few channels at any cell site must be retuned and reconnected at any one time.

FIG. 14A illustrates a splitting phase beyond the initial shift into directional operation, which may have used a single new cell site, and was chosen to show a small-cell channel assignment pattern corresponding to FIG. 8 overlaid on a typical omnidirectional assignment pattern.

FIG. 14B illustrates a cell-splitting arrangement for all-omnidirectional antennas, utilizing the schematic notation of FIG. 14A, and in this case centered about the site S1. It is again assumed that the channels are arranged in 21 sets. The site S1 still uses in the large-cell mode some channels from the sets 7, 9, and 11. In addition some of the set 7 channels and some channels of set 19 are euipped in the small-cell mode. New small-cell sites are also located as in FIG. 14A, but channel set assignments are different. Once an initial channel set has been selected for use in the small-cell mode at site S1 or at one of the new omnidirectional sites, the considerations for further transitions to the latter mode using underlaid cells and dual cell-size service in the splitting area are much the same as those already described, e.g., generally avoiding assignment of adjacent channels in adjacent cells.

Figure 15:
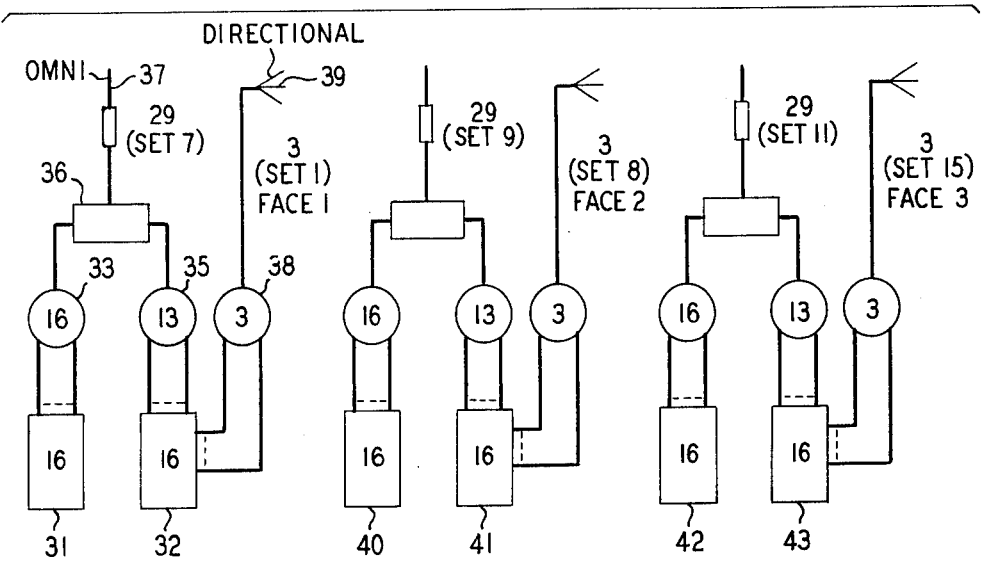
FIG. 15 is a simplified functional diagram of cell site equipment illustrating one way to realize a cell splitting operation of the type in FIG. 14A.

FIG. 15 is a simplified diagram illustrating the transmit portion of an arrangement for the shifting of channels from omnidirectional to directional status at an omnidirectional site on the basis of a few channels at a time. This permits a continued underlaid large-cell mode of operation on a decreasing number of channels as new, overlaid small-cell channels increase in number. The arrangement in FIG. 15 assumes that the omnidirectional site S1 of FIG. 14 had three fully equipped channel sets prior to the splitting operation. These are sets 7, 9 and 11; and since each set at the three respective directional antenna site faces colocated with the omnidirectional antenna is handled in the same fashion, the subsequent description is given in terms of the shifting of only one channel set. Thus, two radio frames 31 and 32, with 16 radio transceivers each, constitute the radio equipment for operating on the 32 channels for the channel-set 7. The sixteen transmitter outputs from radio frame 31 are combined in a cavity multiplexer 33, having the cavities thereof tuned for sixteen channels of set 7, and the output of which is coupled through a second chamber 36 to an omnidirectional antenna 37. Similarly, thirteen of the transmitter outputs from radio frame 32 are coupled through a multiplexer 35, tuned for the remainder of set 7, and the combiner 36 for driving the same omnidirectional antenna 37. At the stage in growth shown in FIG. 15, which was previously discussed in connection with FIG. 14, three transmitter outputs from the radio frame 32 have been retuned to set 1 and are coupled through an extra multiplexer 38, tuned for sixteen channels of set 1, to drive a directional antenna 39 at one face of the cell site. The thirteen unused input ports of multiplexer 38 and the three unused input ports of multiplexer 35 are suitably terminated with impedance-matching networks (not shown) which may be added and removed as required.

Thus, twenty-nine channels of set 7 drive omnidirectional antenna 37, and three channels of set 1 drive the directional antenna 39. From time to time as the system grows, additional transmitters in radio frame 32 are disconnected from multiplexer 35, retuned, and connected to multiplexer 38. Eventually all 16 transmitters of frame 32 are tuned to set 1 and are utilizing the multiplexer 38. At that time the output of multiplexer 33 is shifted to bypass the combiner 36 for directly driving omnidirectional antenna 37. The output of combiner 36 is removed from the omnidirectional antenna 37 and replaces the output of multiplexer 38 as the input to the directional antenna 39. The common output of multiplexer 38, which was removed from the antenna 39, is connected to the now-unused input of combiner 36. Multiplexer 35 is retuned to the remaining 16 channels of set 1. Now, as the system grows, the transmitters of radio frame 31 are gradually retuned to set 1; and their outputs are shifted from multiplexer 33 to multiplexer 35 for driving the directional antenna 39. When all transmitter outputs of radio frame 31 have been so shifted, the omnidirectional antenna 37 and the multiplexer 33 (now unused) are removed from the cell site. The extra multiplexer 38 is advantageously remounted in the position vacated by multiplexer 33. Similar transpositions take place for the radio frame pairs 40, 41 and 42, 43.

Likewise, the receiver portions of the transceivers are handled in a similar manner to that just described for the transmitters for shifting from the omnidirectional to the directional mode of operation. However, the receivers advantageously operate in a diversity mode, and two directional receiving antennas serve each group of sixteen receivers. It is, therefore, necessary to provide power dividing and filtering chains for coupling each omnidirectional receiving antenna to the various radio receivers. There is also provided an extra set of the dual-path power dividing and filtering chains from the two-directional antennas of a diversity receiving pair. Individual receivers are switched from omnidirectional to directional chains in much the same fashion just described for the transmitters.

FIG. 8 showed a partial reproduction of a system with a single size of cells and also indicating the channel sharing function hereinbefore discussed. It has been found that if all channels at a site are pooled for possible use at all faces, the probability of adjacent channels being used in the same cell is greatly increased. This difficulty is avoided in accordance with the aspect of the invention depicted in FIG. 8 wherein each antenna site face is permitted to share a portion of its channels with only one other face at the site. Some or all of the channels of a set can be so shared. The one site face which can be the secondary assignment of such channels is determined by selecting a direction around the site faces for sharing so that adjacent channel interference is minimized in any shared position. This scheme is indicated in FIG. 8 by the arrows extending from one channel set reference character to another around a cell antenna site. Once a direction for sharing has been selected for a particular channel set, it remains the same at that site and wherever that same channel set is reused at other sites regardless of the cell-size mode of operation. The channel sharing function just described increases trunking efficiency since any given cell site radio in a sharing group may be used at either of two cell site faces and so experiences greater traffic usage. This kind of channel sharing is not necessary at omnidirectional sites where all channels are normally grouped together.

Figure 16:
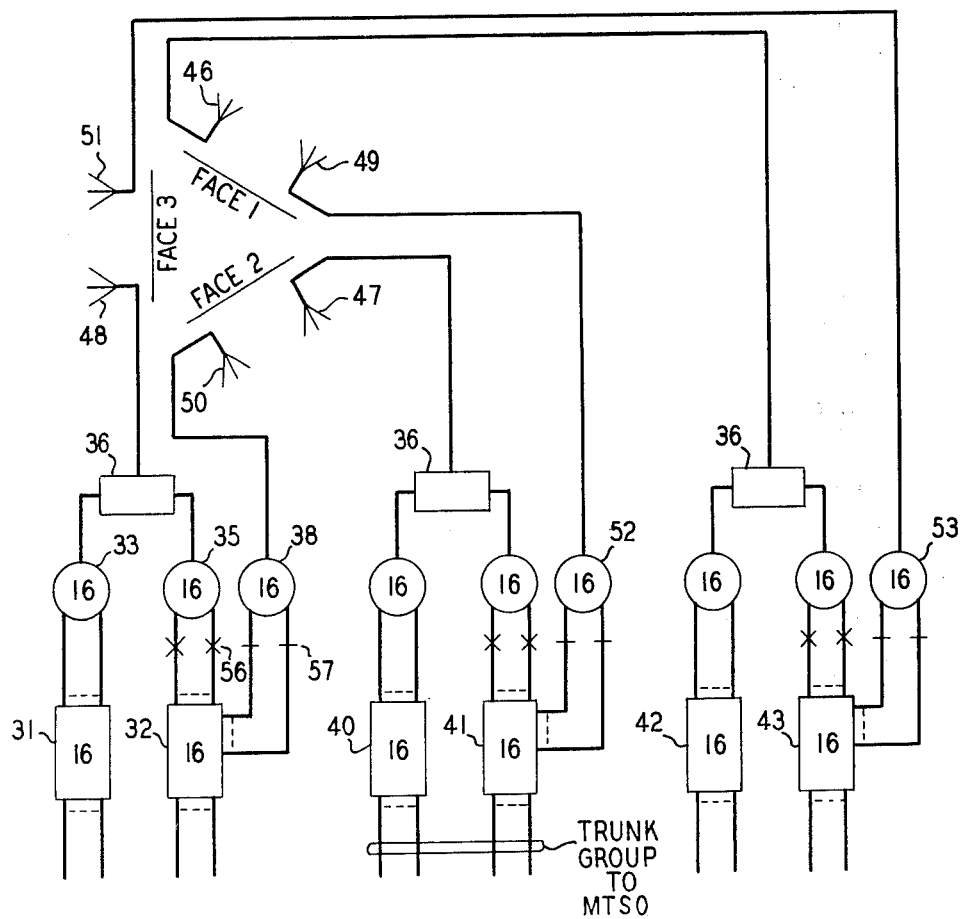
FIG. 16 is a simplified functional diagram of cell site equipment illustrating one way to realize the channel-sharing of FIG. 8.

FIG. 16 illustrates for the transmitting function one arrangement for channel sharing half of the channels in a set in the manner described in connection with FIG. 8. Each of the three antenna faces has a standard directional antenna 46, 47, and 48, respectively, to be driven by the sixteen channels of its assigned set (radio frames 42, 40, and 31, respectively) which are equipped for operation at only that one antenna face. The same antenna at each face also may be driven by sixteen additional channels (radio frames 43, 41, and 32, respectively) which are switchable from that antenna to an additional directional antenna (51, 49, and 50, respectively) at another face. Three pairs of radio frames are provided as previously indicated for FIG. 15; and two multiplexers, e.g., 33 and 35, are provided for combining signals from each different pair of radio frames, e.g., 31 and 32, through an associated combiner 36 to an antenna also as described in connection with FIG. 15. In the case of FIG. 16, however, the sixteen channels for radio frames 32, 41, and 43 are selectably switchable under the control of the central processing unit at MTSO 17 to utilize extra multiplexers 38, 52, 53, respectively.

Switching commands are transmitted by way of data channels in the aforementioned land line paths 18 in FIG. 1 and control individual channel switches schematically represented, for example, by make contact 56 and break contact 57 in FIG. 16. Thus, for example, if additional channels are needed at face 3 of the antenna and some switchable channels in radio frame 43 are not otherwise in use, the MTSO directs the transfer of the outputs of transmitterss of those channels from the face 1 standard antenna 46 connection to a coupling through multiplexer 53 to the additional antenna 51 on face 3. All unused inputs to the multiplexers must be terminated in appropriate impedance matching networks, which are not shown, so that when a channel is switched to a different multiplexer it replaces this network, and the now unused multiplexer input is switched to a matching network. A similar switching is effected for receiving antennas and their associated power dividing and filter chains not specifically shown.

Although the present invention has been described in connection with particular embodiments and applications thereof, it is to be understood that additional embodiments, applications, and modifications which will be obvious to those skilled in the art are included within the spirit and scope of the invention.

What is claimed is:

1. In a cellular high capacity mobile telecommunications system wherein a fixed block of frequency channels is divided into a fixed number of sets of channels that are assigned to antenna sites, each site including means for serving mobile telecommunications units in respective cells and on a channel of the respectively assigned set, the sets being assigned in a predetermined pattern of cells of predetermined size, that pattern being at least partly reusable a sufficient number of times to cover at least part of the service area of the system, an antenna site for serving a cell of reduced size which is at least partially within the same geographic area to be served, at least in part, from an antenna site of a first cell of said predetermined size, and said reduced-size-cell antenna site is assigned a set of channels for serving mobile telecommunication units in such cell, the site including means for serving such units on at least one channel of the assigned set, such set being the same as the set of channels assignable in said pattern to a second predetermined-size-cell antenna site which second-cell site is spaced from the reduced-size-cell site by the reduced-size-cell channel reuse distance and has an assigned channel set not otherwise used within such reuse distance of the reduced-size-cell site.

2. The system in accordance with claim 1 in which the pattern for said predetermined-size cells includes a plurality of predetermined-size-cell antenna sites that are at said small-cell reuse distance from said reduced-size cell site, said second site being one of said plurality of sites, and said second site and one other of said plurality of sites are assigned to the same set of channels in the use and reuse of said pattern for predetermined-size cells and are on opposite sides of said reduced-size-cell site along a substantially straight line including the latter site.

3. The system in accordance with claim 1 in which the reduced-size-cell site serving means includes means for serving a predetermined part of the aforementioned reduced-size-cell, the first cell includes an antenna site positioned for nominally serving a predetermined portion of said first cell, the last mentioned portion including said reduced-cell part, said first-cell site serving means includes means for serving said first-cell portion, and said system includes means for selecting either said first-cell site or said reduced-cell site to serve a telecommunication with a mobile unit in said reduced-cell part.

4. The system in accordance with claim 3 in which the serving means of the first-cell site includes means for serving the reduced-size cell and a coincident part of the first cell with a first part of the channels of the assigned set and means for serving only a part of the reduced-size cell and a coincident part of the first cell with a second part of the channels of such set.

5. The system in accordance with claim 1 in which the reduced-size cell site is the only such site for serving only a reduced-size cell area within the first cell.

6. The system in accordance with claim 1 in which the reduced-size cell is the only reduced-size cell having antenna sites equipped within the first cell.

7. The system in accordance with claim 1 in which the second-cell site is oriented in the second cell with respect to the first-cell site, which site is common to said reduced and said first cells, the same as said reduced-cell site is oriented in the reduced cell with respect to that common cell site.

8. The system in accordance with claim 1 in which at least a plurality of the aforementioned antenna sites for predetermined-size cells includes directional antenna faces for serving different cells at respective different faces of the antenna site, a different channel-set being dedicated to each different face of a given antenna site and thereby having a predetermined orientation with respect to earth, and the channel-set orientation with respect to earth at any given site is the same at any other cochannel antenna site utilizing the same channel-set.

9. The system in accordance with claim 1 in which said serving means of at least one of said sites includes means for directionally communicating with mobile units in plural cells served by such site, said communicating means including different directional antenna faces serving respective ones of said plural cells and having different channel-sets assigned to such antenna faces, respectively, and means for selectively switching at least one of the channels of one of said faces to serve either such face or a second face in a predetermined direction around such site, said direction being chosen to minimize adjacent channel interference with respect to channels assignable, in accordance with said pattern, to nearby ones of said cell sites.

10. The system in accordance with claim 9 in which the channels in said block are numbered in a sequence corresponding to the frequency spectrum sequence of the channels, and said channel-sets assigned to said faces of a directional antenna site are spaced from one another in said channel block number sequence by a predetermined number of channel-sets, which number is equal to the number of cells in said predetermined pattern.

11. In a cellular high capacity mobile telecommunications system wherein a fixed block of frequency channels is divided into a fixed number of sets of channels that are distributed among antenna sites for serving mobile telecommunication units in respective cells in a predetermined pattern of cells of predetermined size, that pattern being at least partly reusable a sufficient number of times to cover at least a part of the service area of the system, at least one of said sites includes a plurality of said channels assigned for use at such one site, and said system includes means for operating said one site so that a first part of said plurality of channels is operated in a first mode for a cell of said predetermined size and a second part of said plurality of channels is operated in a second mode for a cell of a reduced size and included within said cell of predetermined size.

12. The system in accordance with claim 11 in which said one site includes directional antenna means, plural channel radios, first and second portions of said plural radios being tuned to channels of said first and second parts, respectively, of said plurality of channels, and means for coupling said plural channel radios to said directional antenna means.

13. The system in accordance with claim 11 in which said one site includes omnidirectional antenna means, plural channel radios, first and second portion of said plural radios being tuned to channels of said first and second parts, respectively, of said plurality of channels, and means for coupling said plural channel radios to said omnidirectional antenna means.

14. The system in accordance with claim 11 in which said one site includes omnidirectional antenna means, directional antenna means, a plurality of channel radios, and first and second portions of said plurality of radios tuned to channels of said first and second parts, respectively, of said plurality of channels, means for coupling said first portion of said plural channel radios to said omnidirectional antenna means, and means for coupling said second portion of said plural channel radios to said directional antenna means.

15. In a cellular mobile radiotelephone system having the service area thereof divided into a plurality of cells, each cell being one of at least two different sizes, each cell having at least one antenna site with at least one frequency channel for providing radiotelephone service to at least one mobile unit in such cell, the channels for adjacent cells of the same size being different from one another, said antenna site channels being operated using mobile unit location criteria related to the size of cell served by such channel for determining when movement of a mobile unit using a first serving channel requires handoff to a second channel, and at least one part of said service area having available thereto service on channels operated using at least two different ones of said criteria, respectively, the method for identifying at least one channel for use as said second channel comprising the steps of:

determining for an antenna site that is located to serve a cell whether or not there is an available channel for operation using a first one of said criteria, and if no such available channel is identified, determining for the last-mentioned site whether or not there is an available channel for operation using at least another of said criteria.

16. In a cellular mobile radiotelephone system having the service area thereof divided into a plurality of cells of different sizes, each cell having at least one antenna site with at least one frequency channel for providing radiotelephone service to at least one mobile unit in such cell, the channels for adjacent cells of the same size being different from one another, said antenna site channels being operated using mobile unit location criteria related to the size of cell served by such channel for determining when movement of a mobile unit using a first serving channel requires handoff to a second channel, and at least one part of said service area having available thereto service on channels operated using at least two different ones of said criteria, respectively, the method for selecting and second channel comprising the steps of:

determining as to a served mobile unit which of said different criteria said first serving channel therefor is using, determining whether or not such determined criterion requires handoff of said served mobile unit to a different channel, if handoff is required, determining whether or not there is a channel available to said served mobile unit at the serving antenna site and operated using a different one of said criteria from the criterion of said first channel and if so selecting that channel and handing off said mobile unit thereto, and if no such available channel is identified, determining whether or not there is a channel available to said served mobile unit at a different antenna site and meeting said criterion as to said served mobile unit, and if so selecting that channel and handing off said mobile unit thereto.

17. The channel selecting method in accordance with claim 16 in which the channel availability determining step at said serving site comprises the step of determining whether or not there is a channel available there to said served mobile unit for operation in the cell of the current location of the served mobile unit and on a cell-size mode of operation for a cell larger than that of the serving channel.

18. The channel selecting method in accordance with claim 16 in which the channel availability determining step at said different site further comprises the steps of determining whether or not there is a channel for operating in a first cell-size mode and meeting said criterion as to said served mobile unit and if so handing off said served mobile unit thereto, and if no first cell-size-mode channel is identified, determining whether or not there is a channel for operating in a second cell-size mode for cells larger than said serving cell and meeting said criterion as to said served mobile unit and if so handing off said served mobile unit thereto.

19. The channel selecting method in accordance with claim 18 in which said different site is a directional antenna site having plural antenna faces for radiating in different directions, at least one of said faces having at least one channel primarily available for radiation at that face and at least one channel secondarily available for radiation at that face, which secondarily available channel is also primarily available at a different one of said faces, each of said steps for determining availability of channels for operation in a certain cell-size mode further comprises the steps of determining whether or not there is a channel of that certain cell-size mode available as a primary channel if so handing off said served mobile unit thereto, and if no primary channel is available, determining whether or not there is a channel of that certain cell-size mode available as a secondary channel and if so handing off said served mobile unit thereto.

20. In a cellular mobile radiotelephone system having a service area thereof divided into a plurality of cells of different sizes, each cell having at least one antenna site with at least one frequency channel for providing radiotelephone service to at least one mobile unit in such cell, the improvement comprising, in at least one region of the service area, a first cell grid overlaid, in an electromagnetic sense, on a second cell grid for making service selectively available to a mobile unit in that region from either grid, both of said grids being operable on a predetermined mobile unit location criterion for determining when movement of a mobile unit using a first serving channel requires handoff to a second channel, said criterion being based upon a predetermined characteristic of signals received at a cell antenna site from such mobile unit but the criterion threshold for handoff for the first grid represents a substantially higher received mobile unit signal power than for the second grid, and means for assigning a mobile unit to a channel in one of said grids which is operable on a signal threshold mode which, of the thresholds measured as at least equalled by the received mobile unit signal, is that corresponding to the highest received signal power.

21. In a cellular, high capacity, mobile, telecommunications system for providing service to mobile radiotelephone units in a predetermined mobile service area, means for providing said service in an essentially geographically continuous cell grid covering said service area, said grid comprising cells of a first predetermined size, means for further providing said service in an essentially geographically discontinuous cell grid in at least one predetermined part of said service area, the last-mentioned grid comprising cells of a second predetermined size smaller than said first size, and the one part thereby having available therein service through both of said grids, and each of said cells being served by at least one radio antenna site, and, in said one part antenna sites of the one of said grids having cells of the larger of said first and second sizes being substantially colocated with sites of the other of said grids.

22. In a cellular high capacity mobile telecommunications system wherein a fixed block of frequency channels is divided into a fixed number of sets of channels that are distributed among antenna sites for serving mobile telecommunication units in respective cells in a predetermined pattern of cells of predetermined size, that pattern being at least partly reusable a sufficient number of times to cover at least a part of the service area of the system, a reduced-size-cell antenna means for serving a cell of the reduced size which is at least partially within the geographical area served by a predetermined-size first cell, the reduced-size-cell antenna means are assigned a set of channels for serving mobile telecommunication units, which set is the same as a set of channels assigned to a second cell site serving a second cell of the predetermined size and which second cell is contiguous to the first cell and said reduced-size cell, and the reduced-size-cell antenna means are equipped to operate on at least one channel of that assigned set.

* * * * *

UNITED STATES PATENT AND TRADEMARK OFFICE
CERTIFICATE OF CORRECTION

PATENT NO. : 4,144,411

DATED : March 13, 1979

INVENTOR(S) : Richard H. Frenkiel

It is certified that error appears in the above-identified patent and that said Letters Patent are hereby corrected as shown below:

In the Abstract, line 10, "co-channel" should read --cochannel--. Column 8, line 66, "the", second occurrence should read --The--. Column 19, line 15, "state" should read --site--.

Signed and Sealed this

Eleventh Day of September 1979

[SEAL]

Attest:

LUTRELLE F. PARKER

Attesting Officer          Acting Commissioner of Patents and Trademarks